US012811655B2

(12) United States Patent
Li et al.

(10) Patent No.: US 12,811,655 B2
(45) Date of Patent: Nov. 24, 2026

(54) TECHNIQUES FOR CONFIGURATION OF A JOINT CHANNEL STATE INFORMATION REFERENCE SIGNAL RESOURCE AND CHANNEL STATE INFORMATION REFERENCE SIGNAL PORT SELECTION CODEBOOK

(71) Applicant: QUALCOMM Incorporated, San Diego, CA (US)

(72) Inventors: Qiaoyu Li, Beijing (CN); Mahmoud Taherzadeh Boroujeni, San Diego, CA (US); Hamed Pezeshki, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 18/699,175

(22) PCT Filed: Dec. 17, 2021

(86) PCT No.: PCT/CN2021/139023

§ 371 (c)(1),
(2) Date: Apr. 5, 2024

(87) PCT Pub. No.: WO2023/108594

PCT Pub. Date: Jun. 22, 2023

(65) Prior Publication Data

US 2025/0240076 A1 Jul. 24, 2025

(51) Int. Cl.
*H04B 7/06* (2006.01)
*H04B 7/0456* (2017.01)
(Continued)

(52) U.S. Cl.
CPC ......... *H04B 7/0639* (2013.01); *H04B 7/0478* (2013.01); *H04L 5/0048* (2013.01); *H04W 24/10* (2013.01); *H04W 72/02* (2013.01)

(58) Field of Classification Search
CPC ... H04B 7/0639; H04B 7/0478; H04L 5/0048; H04W 24/10
See application file for complete search history.

(56) References Cited

U.S. PATENT DOCUMENTS

2020/0186207 A1* 6/2020 Davydov ............ H04B 7/0658
2020/0204239 A1 6/2020 Kang et al.
(Continued)

FOREIGN PATENT DOCUMENTS

WO WO-2021068149 A1 4/2021
WO WO-2021087948 A1 5/2021
WO WO-2021225325 A1 11/2021

OTHER PUBLICATIONS

Supplementary European Search Report EP21967728 Search Authority Munich Sep. 12, 2025.
(Continued)

*Primary Examiner* — Mohammad S Anwar
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may receive a channel state information (CSI) report setting indicating a report quantity and indicating one or more sets of CSI-RS resources identified by a CSI resource setting associated with the CSI report setting, wherein the report quantity includes a precoding matrix indicator (PMI) based at least in part on a joint CSI reference signal (CSI-RS) resource and CSI-RS port selection codebook, wherein a port selection is based at least in part on the CSI-RS resources indicated by the CSI resource setting. The UE may communicate with a base station in accordance with the CSI report setting, the CSI resource setting, and the codebook. Numerous other aspects are described.

30 Claims, 11 Drawing Sheets

700

(51) Int. Cl.
*H04L 5/00* (2006.01)
*H04W 24/10* (2009.01)
*H04W 72/02* (2009.01)

(56) References Cited

U.S. PATENT DOCUMENTS

2021/0242914 A1* 8/2021 Park ........................ H04B 7/063
2021/0320704 A1 10/2021 Hao et al.
2023/0163911 A1 5/2023 Hao et al.

OTHER PUBLICATIONS

Huawei, et al., "Technical Categorization for CSI Enhancements MTRP and FR1 FDD Reciprocity", 3GPP TSG RAN WG1 Meeting #102-e, R1-2007268, E-meeting, Aug. 17, 2020-Aug. 28, 2020, 17 Pages, Aug. 28, 2020 (Aug. 28, 2020) the whole document.

International Search Report and Written Opinion—PCT/CN2021/139023—ISA/EPO—Aug. 1, 2022.

* cited by examiner

TECHNIQUES FOR CONFIGURATION OF A JOINT CHANNEL STATE INFORMATION REFERENCE SIGNAL RESOURCE AND CHANNEL STATE INFORMATION REFERENCE SIGNAL PORT SELECTION CODEBOOK

CROSS-REFERENCE TO RELATED APPLICATION

This Patent Application is a 371 national stage of PCT Application No. PCT/CN2021/139023 filed on Dec. 17, 2021, entitled "TECHNIQUES FOR CONFIGURATION OF A JOINT CHANNEL STATE INFORMATION REFERENCE SIGNAL RESOURCE AND CHANNEL STATE INFORMATION REFERENCE SIGNAL PORT SELECTION CODEBOOK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for configuration of a joint channel state information (CSI) reference signal (RS) (CSI-RS) resource and CSI-RS port selection codebook.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a channel state information (CSI) report setting indicating a report quantity and indicating one or more sets of CSI reference signal (CSI-RS) resources identified by a CSI resource setting associated with the CSI reporting setting, where the report quantity includes a precoding matrix indicator (PMI) based at least in part on a joint CSI-RS resource and CSI-RS port selection codebook, where a port selection is based at least in part on the CSI-RS resources indicated by the CSI resource setting. The method may include communicating with a base station in accordance with the CSI report setting, the CSI resource setting, and the codebook.

Some aspects described herein relate to a method of wireless communication performed by a base station. The method may include transmitting a CSI report setting indicating a report quantity and indicating one or more sets of CSI-RS resources identified by a CSI resource setting associated with the CSI reporting setting, where the report quantity includes a PMI based at least in part on a joint CSI-RS resource and CSI-RS port selection codebook, where a port selection is based at least in part on the CSI-RS resources indicated by the CSI resource setting. The method may include communicating with a UE in accordance with the CSI report setting, the CSI resource setting, and the codebook.

Some aspects described herein relate to a UE for wireless communication. The UE may include a memory and one or more processors coupled to the memory. The one or more processors may be configured to receive a CSI report setting indicating a report quantity and indicating one or more sets of CSI-RS resources identified by a CSI resource setting associated with the CSI reporting setting, where the report quantity includes a PMI based at least in part on a joint CSI-RS resource and CSI-RS port selection codebook, wherein a port selection is based at least in part on the CSI-RS resources indicated by the CSI resource setting. The one or more processors may be configured to communicate with a base station in accordance with the CSI report setting, the CSI resource setting, and the codebook.

Some aspects described herein relate to a base station for wireless communication. The base station may include a memory and one or more processors coupled to the memory. The one or more processors may be configured to transmit a CSI report setting indicating a report quantity and indicating one or more sets of CSI-RS resources identified by a CSI resource setting associated with the CSI reporting setting, where the report quantity includes a PMI based at least in part on a joint CSI-RS resource and CSI-RS port selection codebook, wherein a port selection is based at least in part on the CSI-RS resources indicated by the CSI resource setting. The one or more processors may be configured to communicate with a UE in accordance with the CSI report setting, the CSI resource setting, and the codebook.

Some aspects described herein relate to a non-transitory computer-readable medium that stores a set of instructions for wireless communication by a UE. The set of instructions, when executed by one or more processors of the UE, may cause the UE to receive a CSI report setting indicating a report quantity and indicating one or more sets of CSI-RS resources identified by a CSI resource setting associated with the CSI reporting setting, where the report quantity includes a PMI based at least in part on a joint CSI-RS resource and CSI-RS port selection codebook, wherein a port selection is based at least in part on the CSI-RS resources indicated by the CSI resource setting. The set of instructions, when executed by one or more processors of the UE, may cause the UE to communicate with a base station in accordance with the CSI report setting, the CSI resource setting, and the codebook.

Some aspects described herein relate to a non-transitory computer-readable medium that stores a set of instructions for wireless communication by a base station. The set of instructions, when executed by one or more processors of the base station, may cause the base station to transmit a CSI report setting indicating a report quantity and indicating one or more sets of CSI-RS resources identified by a CSI resource setting associated with the CSI reporting setting, where the report quantity includes a PMI based at least in part on a joint CSI-RS resource and CSI-RS port selection codebook, wherein a port selection is based at least in part on the CSI-RS resources indicated by the CSI resource setting. The set of instructions, when executed by one or more processors of the base station, may cause the base station to communicate with a UE in accordance with the CSI report setting, the CSI resource setting, and the codebook.

Some aspects described herein relate to an apparatus for wireless communication. The apparatus may include means for receiving a CSI report setting indicating a report quantity and indicating one or more sets of CSI-RS resources identified by a CSI resource setting associated with the CSI reporting setting, where the report quantity includes a PMI based at least in part on a joint CSI-RS resource and CSI-RS port selection codebook, where a port selection is based at least in part on the CSI-RS resources indicated by the CSI resource setting. The apparatus may include means for communicating with a base station in accordance with the CSI report setting, the CSI resource setting, and the codebook.

Some aspects described herein relate to an apparatus for wireless communication. The apparatus may include means for transmitting a CSI report setting indicating a report quantity and indicating one or more sets of CSI-RS resources identified by a CSI resource setting associated with the CSI reporting setting, where the report quantity includes a PMI based at least in part on a joint CSI-RS resource and CSI-RS port selection codebook, where a port selection is based at least in part on the CSI-RS resources indicated by the CSI resource setting. The apparatus may include means for communicating with a UE in accordance with the CSI report setting, the CSI resource setting, and the codebook.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
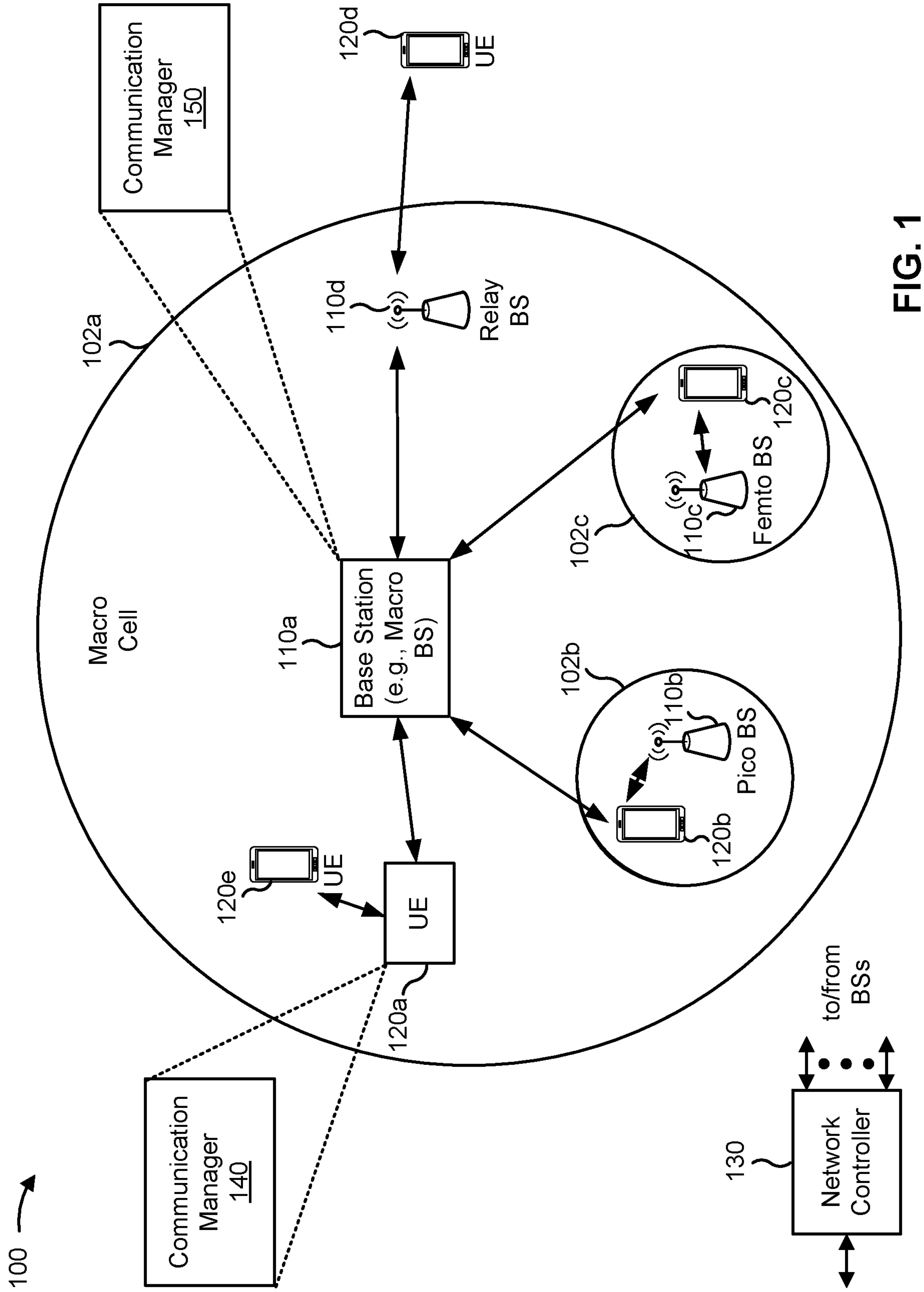
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a channel state information (CSI) report setting indicating a report quantity and indicating one or more sets of CSI reference signal (RS) (CSI-RS) resources identified by a CSI resource setting associated with the CSI reporting setting, wherein the report quantity includes a precoding matrix indicator (PMI) based at least in part on a joint CSI-RS resource and CSI-RS port selection codebook, wherein a port selection is based at least in part on the CSI-RS resources indicated by the CSI resource setting; and communicate with a base station in accordance with the CSI report setting, the CSI resource setting, and the codebook. Additionally, or alternatively, the communication manager 140 may perform one or more other operations described herein.

In some aspects, the base station 110 may include a communication manager 150. As described in more detail elsewhere herein, the communication manager 150 may transmit a CSI report setting indicating a report quantity and indicating one or more sets of CSI-RS resources identified by a CSI resource setting associated with the CSI reporting setting, wherein the report quantity includes a PMI based at least in part on a joint CSI-RS resource and CSI-RS port selection codebook, wherein a port selection is based at least in part on the CSI-RS resources indicated by the CSI resource setting; and communicate with a UE in accordance with the CSI report setting, the CSI resource setting, and the codebook. Additionally, or alternatively, the communication manager 150 may perform one or more other operations described herein.

As indicated above, FIG. 1 is provided as an example. Other examples may differ from what is described with regard to FIG. 1.

Figure 2:
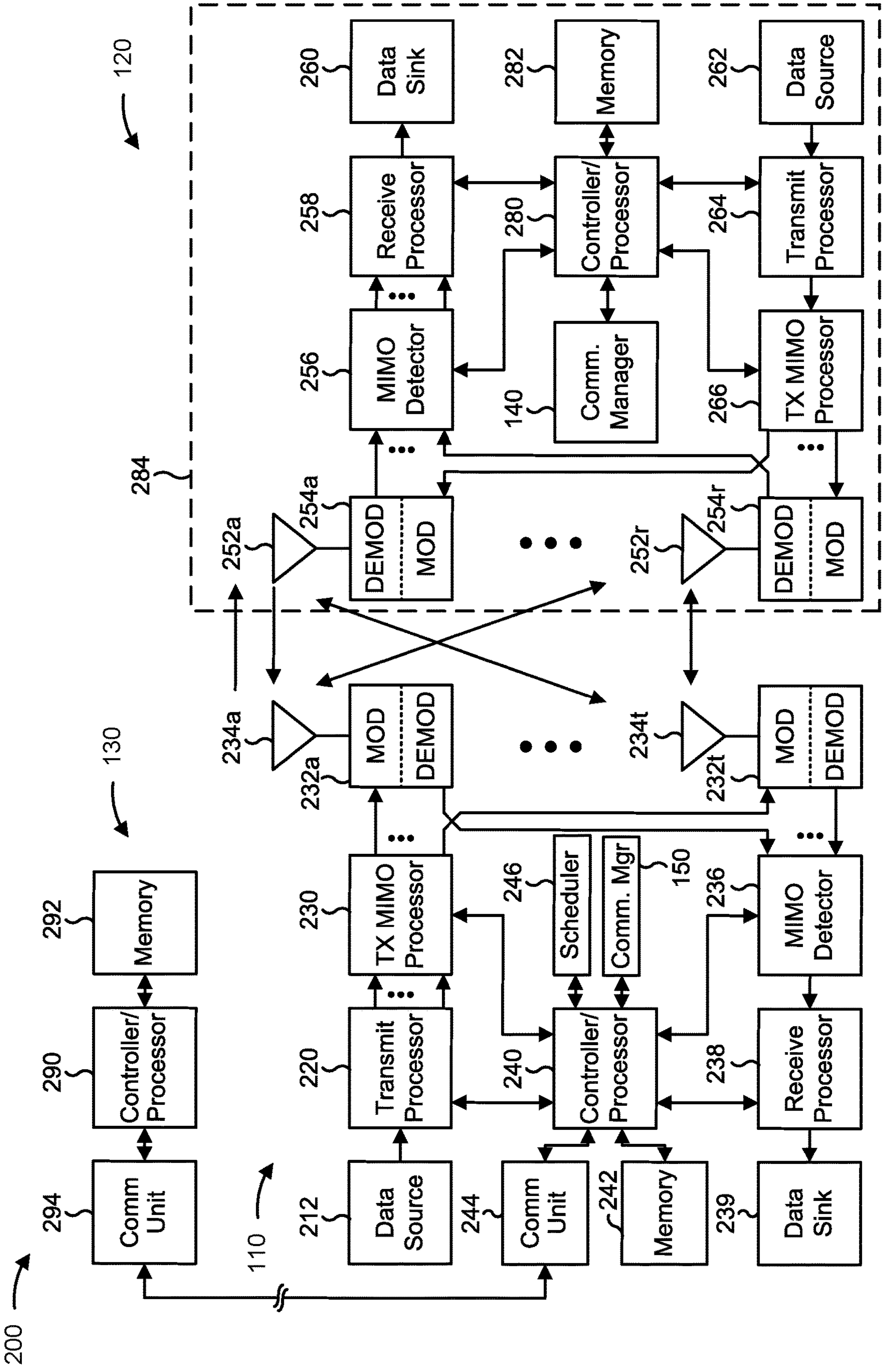
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-9).

The controller/processor 240 of the base station 110, the controller/processor 280 of the UE 120, and/or any other component(s) of FIG. 2 may perform one or more techniques associated with configuration of a joint CSI-RS resource and CSI-RS port selection codebook, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving a CSI report setting indicating a report quantity and indicating one or more sets of CSI-RS resources identified by a CSI resource setting associated with the CSI reporting setting, wherein the report quantity includes a PMI based at least in part on a joint CSI-RS resource and CSI-RS port selection codebook, wherein a port selection is based at least in part on the CSI-RS resources indicated by the CSI resource setting; and/or means for communicating with a base station in accordance with the CSI report setting, the CSI resource setting, and the codebook. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a CSI report setting indicating a report quantity and indicating one or more sets of CSI-RS resources identified by a CSI resource setting associated with the CSI reporting setting, wherein the report quantity includes a PMI based at least in part on a joint CSI-RS resource and CSI-RS port selection codebook, wherein a port selection is based at least in part on the CSI-RS resources indicated by the CSI resource setting; and/or means for communicating with a UE in accordance with the CSI report setting, the CSI resource setting, and the codebook. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
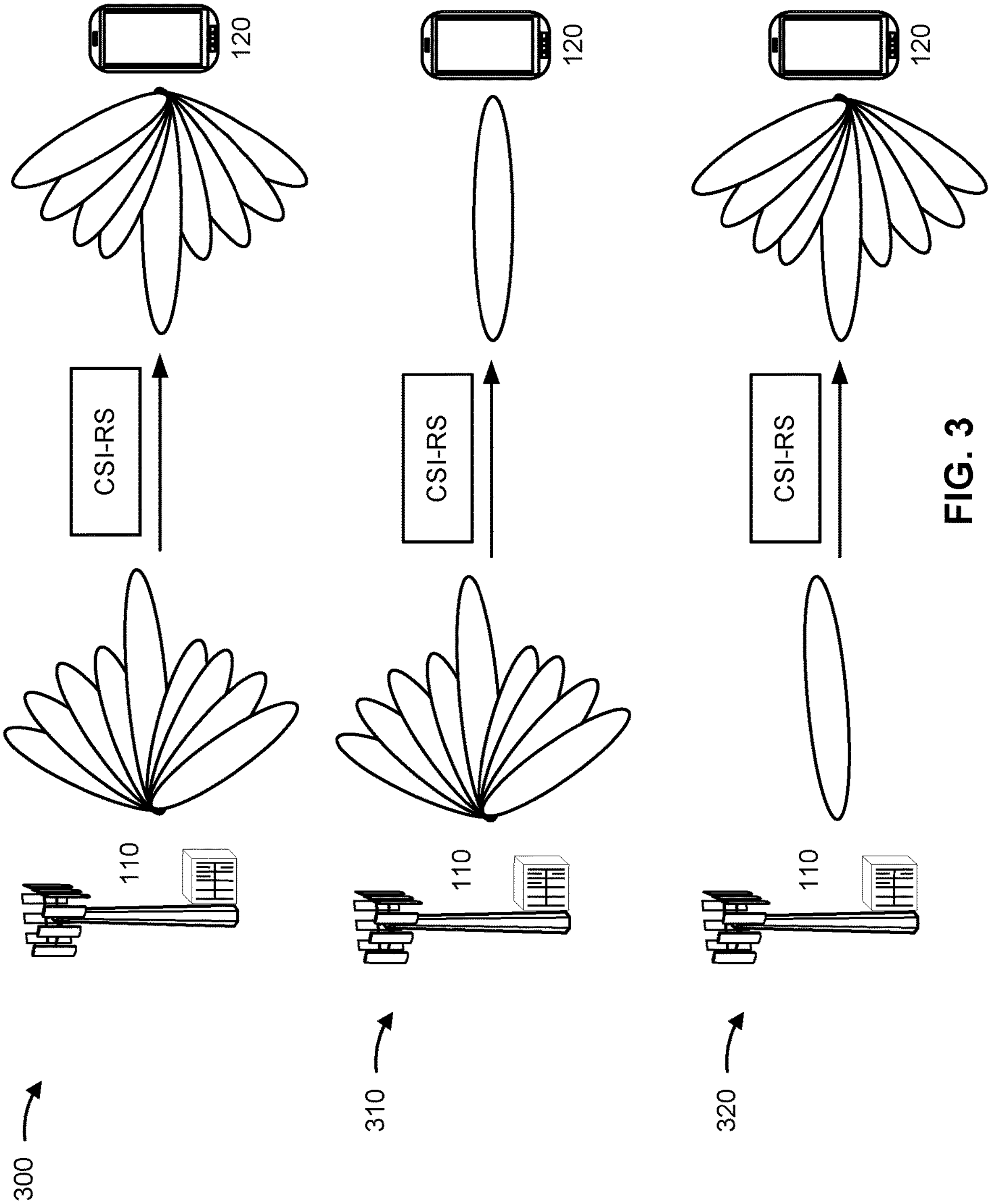
FIG. 3 is a diagram illustrating an example of channel state information (CSI) reference signal (RS) (CSI-RS) beam management procedures, in accordance with the present disclosure.

FIG. 3 is a diagram illustrating examples 300, 310, and 320 of CSI-RS beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, and/or between a scheduled node and a scheduling node). In some aspects, the UE 120 and the base station 110 may be in a connected state (e.g., a radio resource control (RRC) connected state).

As shown in FIG. 3, example 300 may include a base station 110 and a UE 120 communicating to perform beam management using CSI-RSs. Example 300 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 3 and example 300, CSI-RSs may be configured to be transmitted from the base station 110 to the UE 120. The CSI-RSs may be configured to be periodic (e.g., using RRC signaling), semi-persistent (e.g., using media access control (MAC) control element (CE) (MAC-CE) signaling), and/or aperiodic (e.g., using downlink control information (DCI)).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above. For example, UE 120 and base station 110 may perform SSB beam sweeping (e.g., during initial access along with SSB and random access channel (RACH) association) to select a beam pair with a course granularity (e.g., by using wider, layer 1 (L1) beams) before performing CSI-RS beam sweeping (e.g., in a connected mode) to select a beam pair with a finer granularity (e.g., using hierarchical beam refinement, as described herein).

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a hierarchical beam refinement procedure (e.g., a P1, P2, or P3 procedure, as described herein), a base station beam refinement procedure, a TRP beam refinement procedure, and/or a transmit beam refinement procedure. As shown in FIG. 3 and example 310, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120. In some cases, UE 120 may report a linear combination of beamformed CSI-RS ports as a precoding matrix indicator (PMI). Additionally, or alternatively, in some frequency ranges, such as FR2, base station 110 may generate a linear combination of a set of beams to form a new beam (e.g., a CSI-RS may be a linear combination of multiple SSB beams). For example, base station 110 may transmit a first beam (e.g., an SSB) with a first basis $b_1$ and a second beam (e.g., an SSB) with a second basis $b_2$ and UE 120 may identify a preferred beam as a linear combination of the beams, $c_1b_1+c_2b_2$, where c represents a quantized coefficient for a beam. In this case, UE 120 may report indices of the beams (e.g., $b_1$ and $b_2$) and the quantized coefficients $c_1$ and $c_2$ from which base station 110 may derive a preferred beam for UE 120.

As shown in FIG. 3, example 320 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 3 and example 320, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams). In some cases, beam failure recovery procedures may be used to recover a beam after a detected beam failure or radio link failure procedures may be used to identify a new beam after a detected beam or radio link failure.

In some cases, UE 120 and base station 110 may use beam prediction to reduce a quantity of beam measurements associated with selecting a beam (e.g., in one or more of the aforementioned beam management procedures). For example, when beam prediction is not used, UE 120 and base station 110 may communicate (e.g., by transmitting a CSI-RS and performing measurements and by reporting the measurements) on each beam across a beam sweep. However, when beam prediction is used, base station 110 and UE 120 may forgo transmission or measurement of one or more beams of the beam sweep. For example, for a set of consecutive beams (e.g., with regard to beam angle) that are configured for base station 110, base station 110 may forgo transmission of one or more beams within the set of consecutive beams. In this case, base station 110 may completely forgo one or more beam transmissions or may selectively transmit one or more beams based at least in part on whether UE 120 is performing initial access or not or based at least in part on how recently the one or more beams were transmitted. Additionally, or alternatively, base station 110 may transmit all of the beams in the set of consecutive beams, but UE 120 may forgo measurement of one or more beams within the set of consecutive beams. In these cases, base station 110 and/or UE 120 may interpolate (e.g., using artificial intelligence or another prediction technique) from measured beams to predict beam measurements (e.g., an RSRP) for one or more beams that have not been transmitted and/or measured.

Similarly, base station 110 and/or UE 120 may forgo transmission and measurement of beams with a higher granularity. For example, rather than a first beam management procedure using wide beams and a second beam management procedure using narrow beams, base station 110 may forgo transmission and/or UE 120 may forgo measurement of the narrow beams. In this case, base station 110 and/or UE 120 may predict beam measurements for the narrow beams (e.g., that have not been transmitted and/or measured) based at least in part on beam measurements of the wide beams (e.g., that have been transmitted and measured) and/or based at least in part on past beam predictions or measurements. In these ways, base station 110 and/or UE 120 reduce a quantity of UE-side beam measurements and/or a UE-specific communication overhead, thereby improving UE performance and/or network performance.

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, and/or the UE 120 and the base station 110 may perform a similar beam management procedure to select a UE transmit beam.

Figure 4:
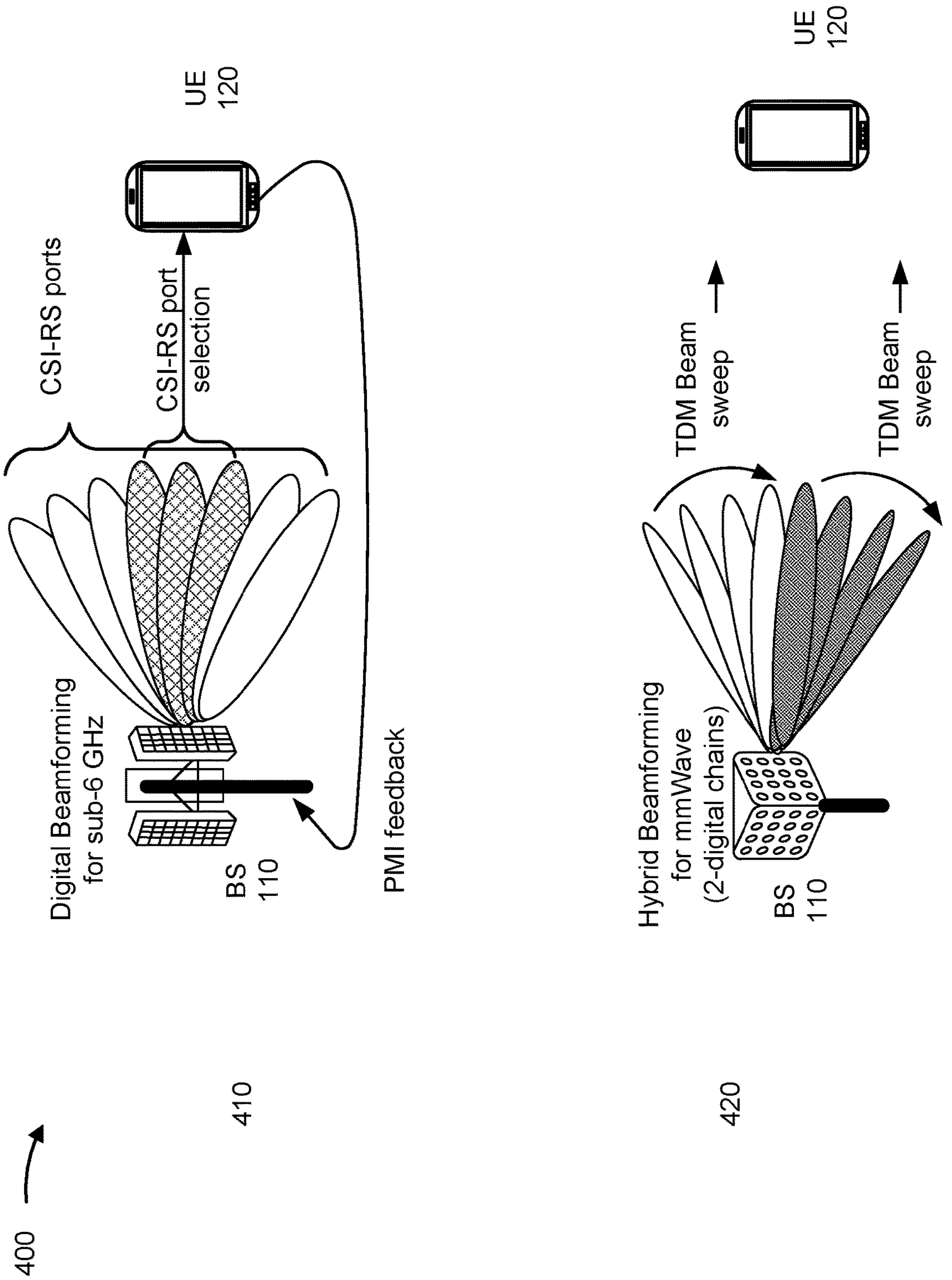
FIG. 4 is a diagram illustrating an example of beamforming for CSI-RS port selection, in accordance with the present disclosure.

FIG. 4 is a diagram illustrating an example 400 of CSI-RS port selection, in accordance with the present disclosure.

As shown in FIG. 4, and by reference number 410, in digital beamforming (e.g., for sub-6 GHz frequency bands), a base station 110 may use a port selection codebook based on linear combinations of different CSI-RS ports for port selection. The different CSI-RS ports may be at least frequency division multiplexed (FDM) or code division multiplexed (CDM). In other words, for example, the different CSI-RS ports may be FDM-only or FDM and time division multiplexed (TDM). As another example, the CSI-RS ports may be CDM-only or CDM and TDM. As another example, the CSI-RS ports may be FDM, CDM, and TDM. UE 120 may receive beams from base station 110 in accordance with the port selection code and may determine a PMI and may transmit PMI feedback including the PMI to base station 110. The PMI feedback may be wideband-specific or subband-specific.

As an example, for UEs 120 configured in accordance with 3GPP Release 15 (Rel-15), sub-band-specific PMI feedback may include a sub-band-specific coefficient report (e.g., identifying one or more quantized coefficients of one or more beams). This may be termed a "Rel-15 Type-II" coefficient feedback scheme. The Rel-15 Type-II PMI codebook may have a structure of $W=W_1W_2$, where $$W_1 = \begin{bmatrix} B & 0 \\ 0 & B \end{bmatrix},$$

which may correspond to $$W = \begin{bmatrix} \tilde{w}_{0,0} \\ \tilde{w}_{1,0} \end{bmatrix} = W_1 W_2$$

for rank 1 (with W being normalized to 1) and $$W = \begin{bmatrix} \tilde{w}_{0,0} & \tilde{w}_{0,1} \\ \tilde{w}_{1,0} & \tilde{w}_{1,1} \end{bmatrix} = W_1 W_2$$

for rank 2 (with W being normalized to $1/\sqrt{2}$). A weighted combination of L beams may take the form of $$\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i},$$

where L is a configurable value, b represents an oversampled 2D discrete Fourier transform (DFT) beam, r represents a polarization value, l represents a layer, p represents a wideband (WB) or sub-band (SB) scaling factor, and c is a beam combining coefficient. As another example, for UEs 120 configured in accordance with 3GPP Release 16 (Rel-16), sub-band-specific PMI feedback may be subject to full-duplex (FD) compression and include a sub-band-specific coefficient report. This may be termed a "Rel-16 eType-II" coefficient scheme.

As further shown in FIG. 4, and by reference number 420, in hybrid beamforming (e.g., in mmWave or FR2), base station 110 and UE 120 may perform beam prediction using beam sweeping and two digital chains. In this case, to accommodate analog beamforming, basis beams (e.g., SSB beams) are swept over time, but a subset of beams may be FDM or CDM if beams in the subset of beams have different digital chains. For example, UE 120 may have a first TDM beam sweep (associated with a first digital chain) with analog beamforming and a second TDM beam sweep (associated with a second digital chain) with analog beamforming. The first TDM beam sweep (and, similarly, the second TDM beam sweep) may not have any CDM or FDM CSI-RS ports. However, a CSI-RS port associated with the first TDM beam sweep may be TDM or FDM with a CSI-RS port associated with the second TDM beam sweep. Rel-15 and Rel-16 UEs may have CSI-RS patterns with joint TDM, FDM, and CDM layouts, but may be subject to certain restrictions. For example, a number of CSI-RS ports may be capped at 32 or a number of FDM CSI-RS ports may be at least 8 (e.g., corresponding to at least 8 digital chains).

As indicated above, FIG. 4 is provided as an example. Other examples may differ from what is described with respect to FIG. 4.

Some aspects described herein provide for a joint CSI-RS resource and CSI-RS port selection codebook. For example, a base station may configure and use a joint CSI-RS resource and CSI-RS port selection codebook for beam measurement and beam reporting to enable beam prediction with hybrid beamforming. In this way, the base station and the UE may obviate some restrictions associated with Rel-15 and Rel-16 frameworks for CSI-reporting and port selection, thereby enabling improved network performance, reduced network overhead, and improved device (e.g., UE) performance.

Figure 5A:
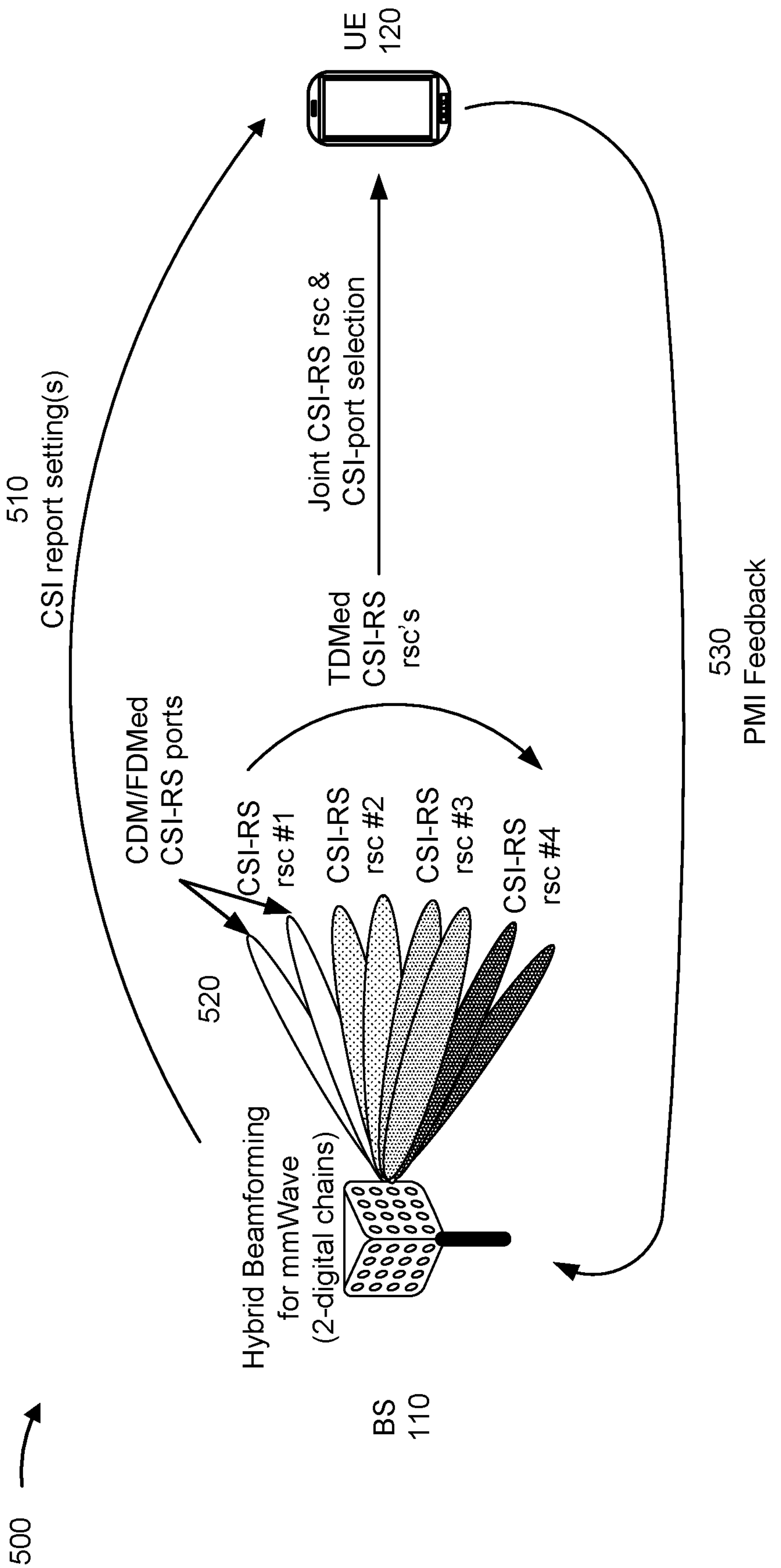
FIGS. 5A-5C are diagrams illustrating examples associated with configuration of a joint CSI-RS resource and CSI-RS port selection codebook, in accordance with the present disclosure.
Figure 5B:
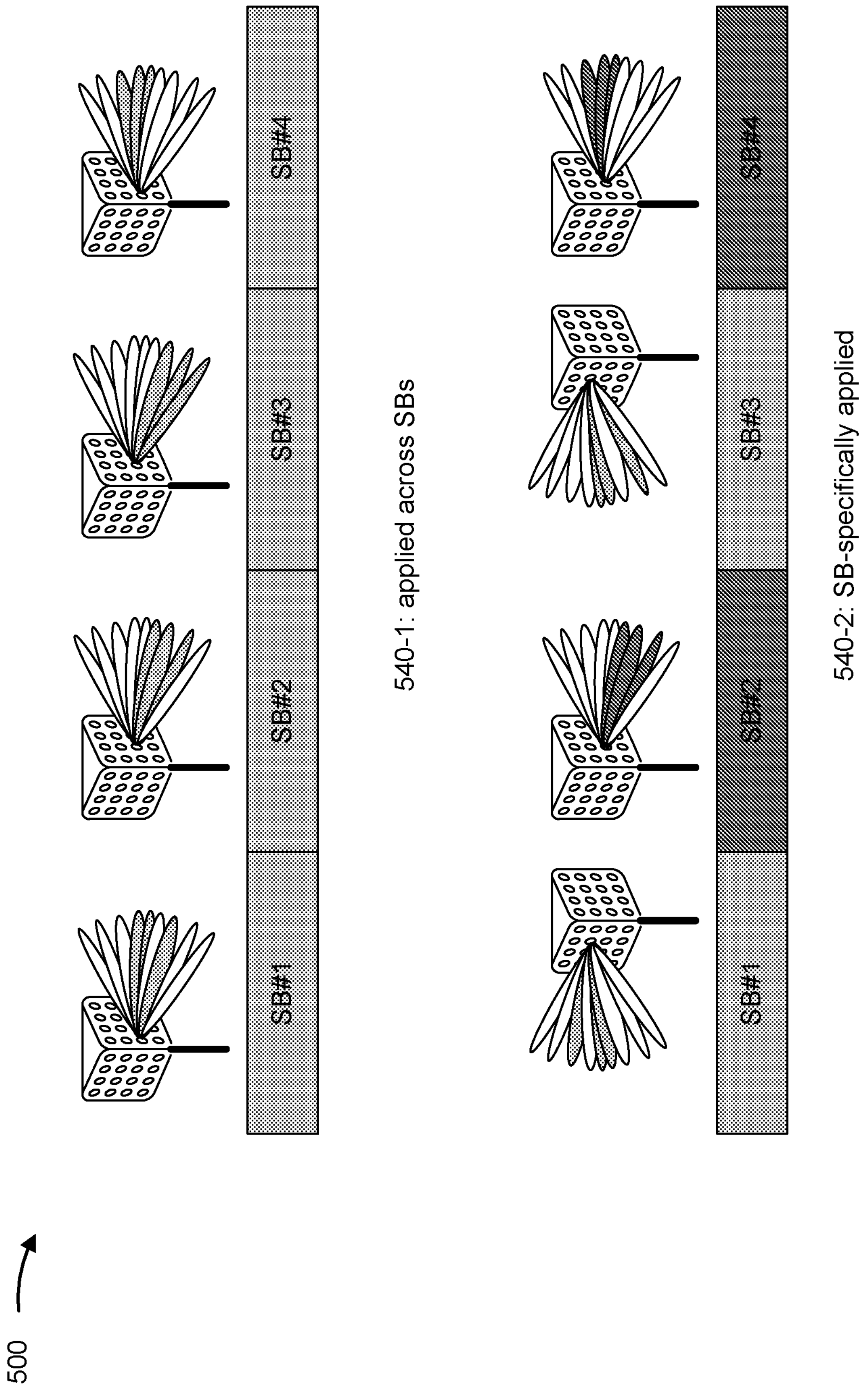
Figure 5C:
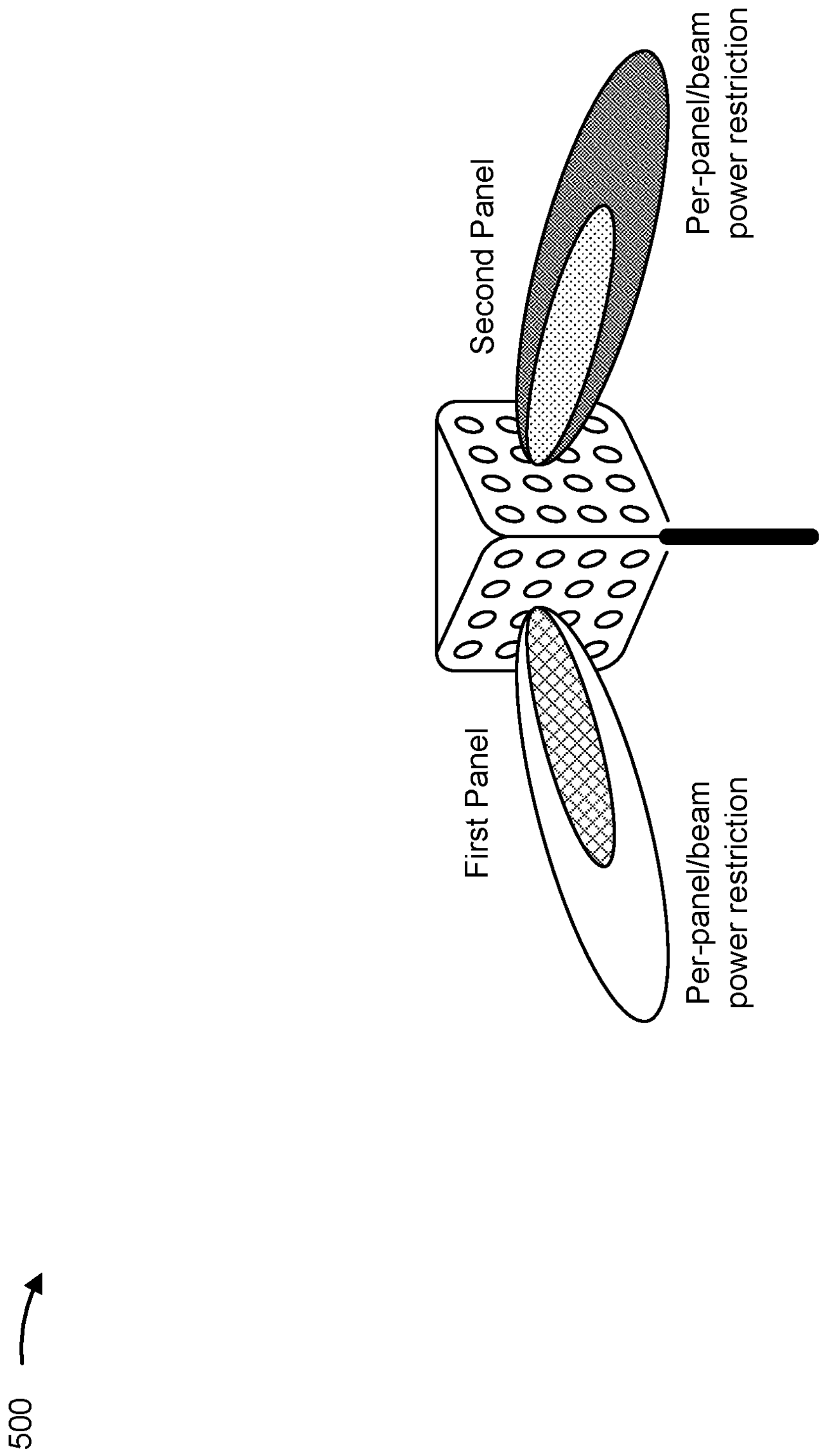

FIGS. 5A-5C are diagrams illustrating an example 500 associated with configuration of a joint CSI-RS resource and CSI-RS port selection codebook, in accordance with the present disclosure. As shown in FIG. 5A, example 500 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink.

As further shown in FIG. 5A, and by reference number 510, base station 110 may configure UE 120 with one or more CSI report settings. An example of a CSI report setting is described, in more detail, in 3GPP Technical Specification (TS) 38.214, Rel-16, version 16.7.0. Base station 110 may provide a CSI report setting including a PMI and/or including information identifying a joint CSI-RS resource and CSI-RS port selection codebook. In some aspects, base station 110 may provide a single CSI report setting or multiple CSI report settings. In some aspects, base station 110 may configure the joint CSI-RS resource and CSI-RS port selection codebook using a dedicated information element (IE). For example, UE 120 may receive a CodebookConfig-R19 IE. In some aspects, the dedicated IE may be included in a CSI report configuration IE (CSI-ReportConfig), which may be associated with the CSI report setting, that identifies at least a portion of the CSI report setting, as described in more detail in 3GPP TS 38.331, Rel-16, version 16.6.0. In some aspects, the CSI-ReportConfig IE may be associated with a PMI feedback report, as described herein, that is based at least in part on past measurements and/or predicted future beams. In some aspects, UE 120 may receive a CSI resource configuration (CSI-ResourceConfig) associated with a CSI resource setting.

As shown, the CSI-RSs, on which PMI feedback is to be based at least in part, may be associated with a plurality of CSI-RS resources, such as a first CSI-RS resource (rsc #1), a second CSI-RS resource (rsc #2), a third CSI-RS resource (rsc #3), and a fourth CSI-RS resource (rsc #4). Each CSI-RS resource is associated with a set of CSI-RS ports. A set of CSI-RS ports may be at least FDM or CDM (e.g., FDM-only, FDM and TDM, CDM-only, etc., as described above). For example, the first CSI-RS resource may include a first CSI-RS port FDM with a second CSI-RS port. Further, the CSI-RS resources may be TDM. For example, the first CSI-RS resource, the second CSI-RS resource, the third CSI-RS resource, and the fourth CSI-RS resource may be TDM in accordance with the joint CSI-RS resource and CSI-RS port selection codebook. In some aspects, some CSI-RS resources may include single-port CSI-RS and other CSI-RS resources may include multiple-port CSI-RS. For example, the first CSI-RS resource may be associated with a single CSI-RS port and the second CSI-RS resource, as shown, may be associated with two CSI-RS ports. Other quantities of CSI-RS resources and associated CSI-RS ports are contemplated.

In some aspects, the PMI (for the joint CSI-RS resource and CSI-RS port selection codebook) is associated with one or more selection subsets of a number of CSI-RS resources from a CSI-ResourceConfig 1E that is associated with the CSI-ReportConfig 1E of the CSI report setting. Additionally, or alternatively, the PMI may be associated with a selection set, for one or more selected CSI-RS resources, of a number of CSI-RS ports.

In some aspects, a number of resources (e.g., CSI-RS or SSB resources) or CSI-RS ports within a selection subset or selection set may be statically defined in a specification or configured by base station 110 for UE 120. For example, base station 110 may configure UE 120 to select a quantity x out of X TDM CSI-RS resources and a quantity y out of Y CDM CSI-RS ports. Additionally, or alternatively, UE 120 may transmit capability signaling indicating a recommended number of resources or CSI-RS ports within a selection subset or selection set or may autonomously (or semi-autonomously) select a recommended number of resources or CSI-RS ports within a selection subset or selection set. For example, base station 110 may configure UE 120 to select a quantity x out of X TDM CSI-RS resources and UE 120 may autonomously determine and report a selection set $\{y_1, y_2, \ldots, y_x\}$ of CSI-RS ports out of Y CDM CSI-RS ports. In some aspects, the number of resources or CSI-RS ports in a selection subset or selection set and/or a composition of a selection subset or selection set itself (e.g., which resources or ports are in the selection subset or selection set) is layer-common, layer-specific, resource indicator (RI)-common, or RI-specific (e.g., based at least in part on a static configuration in a specification, a base station 110 indicated configuration, or a UE 120 determination).

Additionally, or alternatively, the PMI (for the joint CSI-RS resource and CSI-RS port selection codebook) may be associated with quantized linear combination coefficients of the selected CSI-RS resources and of the selected CSI-RS ports associated with the selected CSI-RS resources. The quantized linear combination coefficients that UE 120 reports may be wideband-specific or sub-band-specific (e.g., Rel-15 Type-II or FD-compressed Rel-16 eType-II, as described above). In such cases, the joint CSI-RS resource and CSI-RS port selection codebook may have PMI, similar to Rel-15 or Rel-16 codebooks, but associated with joint resource and port selections. In some aspects, PMI (for the joint CSI-RS resource and CSI-RS port selection codebook) may be associated with an L1 RSRP (L1-RSRP) or an L1 signal-to-interference-plus-noise ratio (SINR) (L1-SINR) of a linear combination of selected CSI-RS resources or of selected CSI-RS ports associated with the selected CSI-RS resources.

As further shown in FIG. 5A, and by reference numbers 520 and 530, base station 110 may transmit CSI-RS beams associated with CSI-RS resources and CSI-RS ports and UE 120 may provide PMI feedback based at least in part on measurements of the CSI-RS beams. In some aspects, UE 120 may define the PMI, of a PMI feedback report, for CSI-RS resource and CSI-RS port selection without a CSI-RS resource indicator (CRI) as a report quantity. For example, UE 120 may first report a matrix or vector that identifies selected one or more CSI-RS resources and may second, report, for each selected CSI-RS resource, a matrix or vector identifying one or more selected CSI-RS ports. In this case, the PMI feedback report may include a set of bitmaps or combinatorial numbers. Additionally, or alternatively, UE 120 may jointly report a matrix or vector identifying the selected CSI-RS resources and associated CSI-RS ports. In this case, the PMI feedback report may include a value for a bitmap or combinatorial number that covers each possible case of selected CSI-RS resources and associated CSI-RS ports.

In some aspects, UE 120 may define the PMI based at least in part on a CRI as a report quantity. For example, UE 120 may first report a CRI of selected CSI-RS resources, and may second, report, for each selected CSI-RS resource, a matrix or vector identifying one or more selected CSI-RS ports. In this case, the PMI feedback report may include a set of bitmaps or combinatorial numbers. Additionally, or alternatively, UE 120 may first report the CRI, and may second, jointly report a matrix or vector identifying all the selected CSI-RS ports associated with all the selected CSI-RS resources. In this case, the PMI feedback report may include a value for a bitmap or combinatorial number that covers each possible case of selected CSI-RS resources and associated CSI-RS ports.

In some aspects, UE 120 may select a CSI-RS resource that includes a single-port CSI-RS. For example, as described above, when the CSI-RS resources include some CSI-RS resources with single-port CSI-RS and some CSI-RS resources with multiple-port CSI-RS, UE 120 may select a CSI-RS resource with single-port CSI-RS. In this case, UE 120 may report the selected CSI-RS resource in the PMI feedback report and may forgo reporting a selection of a CSI-RS port in the PMI feedback report, thereby reducing overhead.

In some aspects, UE 120 may be configured with a machine learning model or artificial intelligence technique to generate and report PMI feedback associated with the joint CSI-RS resource and CSI-RS port selection codebook. For example, UE 120 may be configured (e.g., by base station 110) with a neural network based model or a kernel based model, among other examples. UE 120 may use, as input to a machine learning model, a measurement or channel estimation of a CSI-RS resource and associated CSI-RS port. UE 120 may generate, as output from the machine learning model, PMI feedback as described herein.

In some aspects, UE 120 may use a CSI processing unit (CPU) for CSI report generation and associated PMI feedback in connection with the joint CSI-RS resource and CSI-RS port selection codebooks. The CSI processing unit may be an entity, representing a set of resources of UE 120, allocated for CSI report generation. A number of occupied CSI processing units of UE 120 may correspond to a number of configured CSI-RS resources and a number of CSI-RS ports configured for each configured CSI-RS resource. For example, when UE 120 receives a CSI-ReportConfig 1E configuring X CSI-RS resources each associated with Y CSI-RS ports, UE 120 may have aXY occupied CSI report processing units, where a is a coefficient value statically configured in a specification, configured for UE 120 by base station 110, or selected by UE 120. Additionally, or alternatively, when different CSI-RS resources (or SSB resources) have different periodicities, the number of occupied CSI processing units may correspond to a number of CSI-RS resources associated with each periodicity and a total number of different periodicities. For example, with X CSI-RS resources in a first periodicity group $M_1$ and Y CSI-RS resources in a second periodicity group $M_2$, UE 120 may have $(a_1/M_1)\times+(a_2/M_2)$ Y occupied CSI report processing units.

Additionally, or alternatively, the number of occupied CSI processing units may correspond to a number of selected CSI-RS ports in the joint CSI-RS resource and CSI-RS port selection codebook or a ratio of the number of selected CSI-RS ports to a total number of configured CSI-RS ports across CSI-RS resources of the joint CSI-RS resource and CSI-RS port selection codebook. For example, when UE 120 is configured with X CSI-RS resources each having Y CSI-RS ports and UE 120 selects x CSI-RS resources each with y CSI-RS ports, UE 120 may have (axy)/(XY) occupied CSI processing units. Additionally, or alternatively, the number of occupied CSI processing units may correspond to a bandwidth of a set of sub-bands, a number of sub-bands, or a sub-band size of sub-bands configured for UE 120. Additionally, or alternatively, the number of occupied CSI processing units may correspond to a number of FD compression bases (e.g., SSBs).

As shown in FIG. 5B, the joint CSI-RS resource and CSI-RS port selection codebook may have a linear combination restriction. The linear combination restriction may restrict whether linear combinations can be applied to two or more subsets of the configured CSI-RS resources and CSI-RS ports. For example, with 8 CSI-RS resources (numbered 1-8) each including 4 CSI-RS ports and UE 120 being configured to select 3 CSI-RS resources, each with 2 CSI-RS ports, a linear combination restriction may allow CSI-RS resources 1-4 to be linearly combinable and CSI-RS resources 5-8 to be linearly combinable. In some aspects, a linear combination restriction may be applied across all sub-bands. For example, as shown by reference number 540-1, UE 120 may report linear combinations of CSI-RSs 1-3 for sub-band (SB) #1 and may use CSI-RSs 2-4 for SB #2. In some aspects, a linear combination restriction may be applied on a sub-band-specific basis. For example, as shown by reference number 540-2, UE 120 may report linear combinations using CSI-RSs 1-3 for SB #1 and CSI-RSs 5-7 for SB #2.

As shown in FIG. 5C, the joint CSI-RS resource and CSI-RS port selection codebook may have a power restriction. For example, when base station 110 transmits different subsets of CSI-RS resources and CSI-RS ports using different antenna panels or antenna elements, the joint CSI-RS resource and CSI-RS port selection codebook may be configured with an amplitude restriction on feedback coefficients by restricting, to less than a threshold, a total allocated power, after linear combination, for a subset of selected CSI-RS resources and associated CSI-RS ports. In this way, power loss may be avoided by ensuring that each subset of CSI-RS resources and CSI-RS ports is enabled to have a full power transmission. In some aspects, the threshold may be based at least in part on a ratio between a total number of selected CSI-RS resources and associated CSI-RS ports to a number of selected CSI-RS resources and associated CSI-RS ports within a subset. Additionally, or alternatively, the threshold may be based at least in part on which CSI-RS resources and CSI-RS ports are selected within a subset. In this case, the power restriction may be applied to an average or total coefficient power associated with a subset of the selected CSI-RS resources and CSI-RS ports.

As indicated above, FIGS. 5A-5C are provided as an example. Other examples may differ from what is described with respect to FIGS. 5A-5C.

Figure 6:
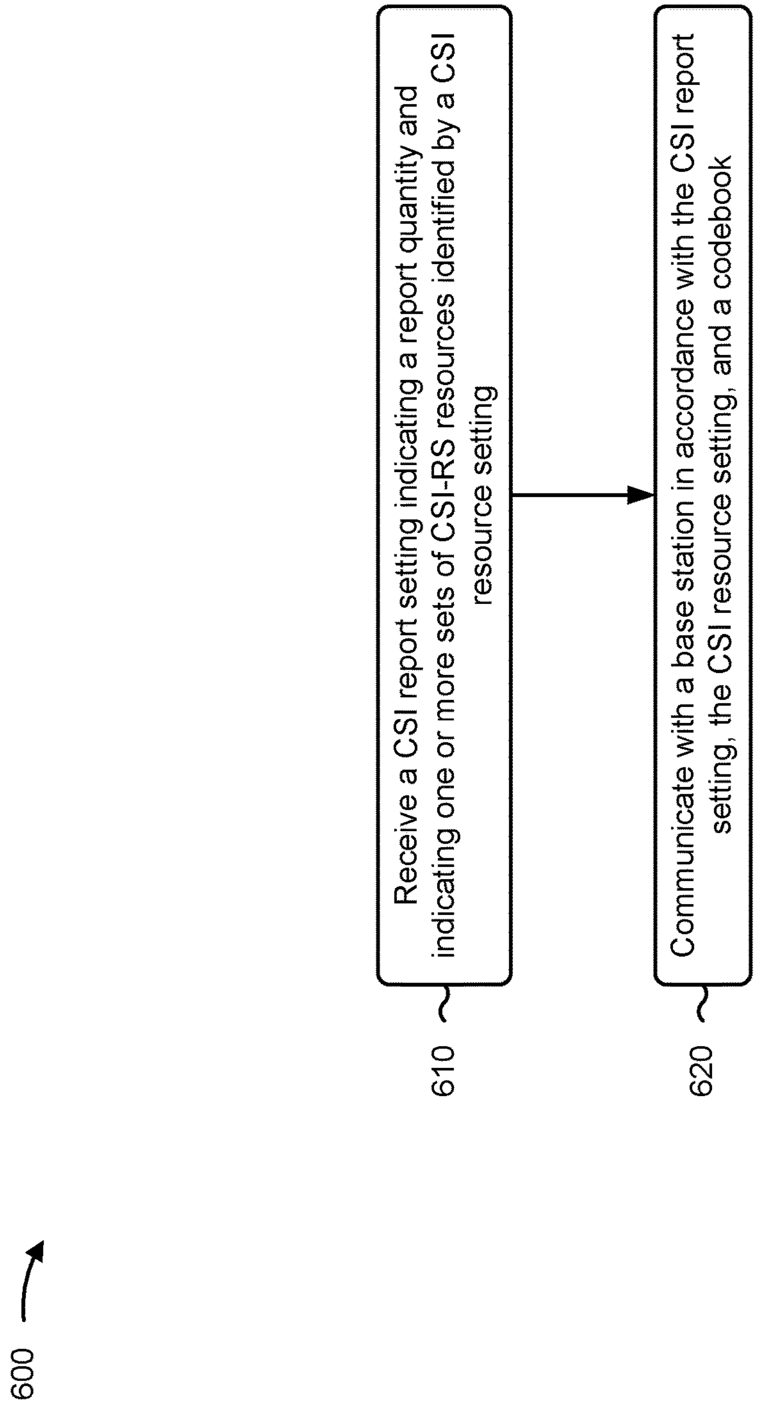
FIGS. 6-7 are diagrams illustrating example processes associated with configuration of a joint CSI-RS resource and CSI-RS port selection codebook, in accordance with the present disclosure.

FIG. 6 is a diagram illustrating an example process 600 performed, for example, by a UE, in accordance with the present disclosure. Example process 600 is an example where the UE (e.g., UE 120) performs operations associated with techniques for configuration of a joint CSI-RS resource and CSI-RS port selection codebook.

As shown in FIG. 6, in some aspects, process 600 may include receiving a CSI report setting indicating a report quantity and indicating one or more sets of CSI-RS resources identified by a CSI resource setting (block 610). For example, the UE (e.g., using communication manager 140 and/or reception component 802, depicted in FIG. 8) may receive a CSI report setting indicating a report quantity and indicating one or more sets of CSI-RS resources identified by a CSI resource setting associated with the CSI report setting, as described above. In some aspects, the report quantity includes a PMI based at least in part on a joint CSI-RS resource and CSI-RS port selection codebook. In some aspects, a port selection is based at least in part on the CSI-RS resources indicated by the CSI resource setting.

As further shown in FIG. 6, in some aspects, process 600 may include communicating with a base station in accordance with the CSI report setting, the CSI resource setting, and the codebook (block 620). For example, the UE (e.g., using communication manager 140 and/or reception component 802 or transmission component 804, depicted in FIG. 8) may communicate with a base station in accordance with the CSI report setting, the CSI resource setting, and the codebook, as described above.

Process 600 may include additional aspects, such as any single aspect or any combination of aspects described below and/or in connection with one or more other processes described elsewhere herein.

In a first aspect, PMI feedback associated with the PMI is based at least in part on a plurality of time division multiplexed CSI-RS resources.

In a second aspect, alone or in combination with the first aspect, a CSI-RS resource, associated with the PMI, is associated with one or more frequency division multiplexed or code division multiplexed CSI-RS ports.

In a third aspect, alone or in combination with one or more of the first and second aspects, the PMI is associated with one or more selection subsets of a number of CSI-RS resources indicated by the CSI resource setting.

In a fourth aspect, alone or in combination with one or more of the first through third aspects, the PMI is, for a selection subset of CSI-RS resources, associated with one or more selection sets of a number of CSI-RS ports.

In a fifth aspect, alone or in combination with one or more of the first through fourth aspects, the PMI is associated with a set of quantized linear combination coefficients of one or more selection subsets of CSI-RS resources and selection sets of CSI-RS ports associated with CSI-RS resources within the one or more selection subsets of CSI-RS resources.

In a sixth aspect, alone or in combination with one or more of the first through fifth aspects, the report quantity indicated by the CSI report setting includes a layer 1 (L1) reference signal received power or an L1 signal-to-interference-plus-noise ratio associated with the PMI.

In a seventh aspect, alone or in combination with one or more of the first through sixth aspects, the CSI report setting is associated with a PMI report based at least in part on a set of past measurements or a set of predicted beams.

In an eighth aspect, alone or in combination with one or more of the first through seventh aspects, a number of selection subsets of CSI-RS resources or a number of selection sets of CSI-RS ports associated with CSI-RS resources of the selection subsets of CSI-RS resources is based at least in part on at least one of a static configuration, a received configuration, or a UE selection, wherein the number of selection subsets or the number of selection sets is layer-common, layer-specific, resource-indicator-common, or resource-indicator-specific.

In a ninth aspect, alone or in combination with one or more of the first through eighth aspects, a set of quantized linear combination coefficients of the codebook is based at least in part on a wideband-specific report or a sub-band-specific report.

In a tenth aspect, alone or in combination with one or more of the first through ninth aspects, the PMI is based at least in part on at least one of a matrix or vector report of a selection subset of CSI-resources or a matrix or vector report of a selection set of CSI-RS ports.

In an eleventh aspect, alone or in combination with one or more of the first through tenth aspects, the PMI is based at least in part on a CSI-RS resource indicator of a subset of selected CSI-RS resources.

In a twelfth aspect, alone or in combination with one or more of the first through eleventh aspects, each CSI-RS resource, of a first selection subset of CSI-RS resources associated with the PMI, is associated with a single CSI-RS port and each CSI-RS resource, of a second selection subset of CSI-RS resources associated with the PMI, is associated with multiple CSI-RS ports.

In a thirteenth aspect, alone or in combination with one or more of the first through twelfth aspects, the PMI is associated with a codebook subset restriction associated with whether a linear combination is applicable to two or more of a subset of CSI-RS resources and CSI-RS ports indicated by the CSI resource setting associated with the CSI report setting.

In a fourteenth aspect, alone or in combination with one or more of the first through thirteenth aspects, the PMI is associated with a codebook subset restriction regarding amplitude restrictions on feedback coefficients.

In a fifteenth aspect, alone or in combination with one or more of the first through fourteenth aspects, the amplitude restrictions are associated with a restriction of a total allocated power for a subset of selected CSI-RS resources and CSI-RS ports.

In a sixteenth aspect, alone or in combination with one or more of the first through fifteenth aspects, the UE is configured with at least one CSI processing unit for a CSI report associated with the codebook.

In a seventeenth aspect, alone or in combination with one or more of the first through sixteenth aspects, a number of CSI processing units is based at least in part on a number of configured CSI-RS resources or a number of CSI-RS ports configured for the configured CSI-RS resources.

In an eighteenth aspect, alone or in combination with one or more of the first through seventeenth aspects, a number of CSI processing units is based at least in part on at least one of a number of different periodicities of CSI-RS or synchronization signal block resources or a number of CSI-RS resources associated with each of the different periodicities.

In a nineteenth aspect, alone or in combination with one or more of the first through eighteenth aspects, a number of CSI processing units is based at least part on a sub-band size, a number of sub-bands, or a number of frequency division compression bases.

In a twentieth aspect, alone or in combination with one or more of the first through nineteenth aspects, the codebook is associated with a dedicated codebook type information element associated with the CSI report setting and indicating the joint CSI-RS resource and CSI-RS port selection codebook.

In a twenty-first aspect, alone or in combination with one or more of the first through twentieth aspects, the UE is configured with one or more machine learning based models to generate a report of the PMI, wherein an input of the one or more machine learning models includes at least one of information associated with a signal measured from CSI-RS resources or CSI-RS ports indicated by the CSI resource setting or channel characteristics estimated from the CSI-RS resources or CSI-RS ports indicated by the CSI resource setting, and wherein an output of the one or more machine learning models includes the PMI and is based at least in part on the joint CSI-RS resource and CSI-RS port selection codebook.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
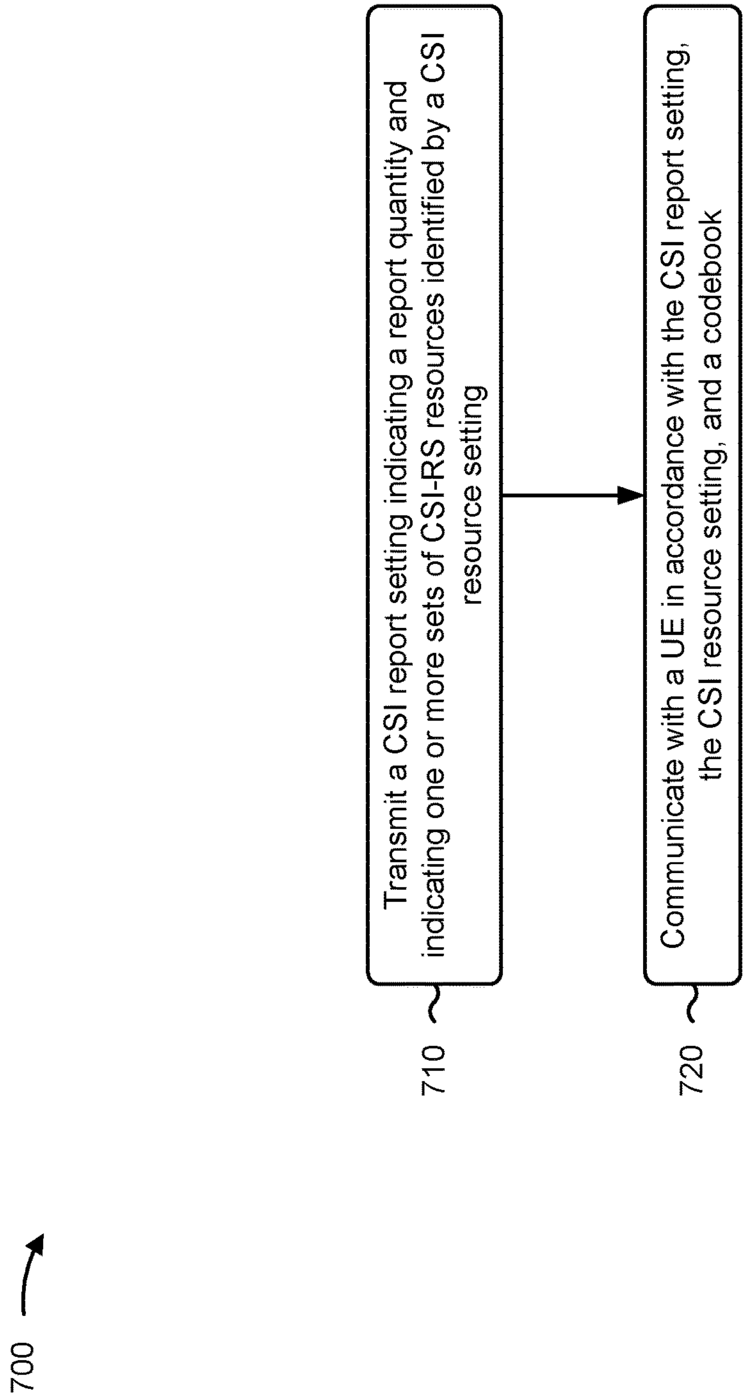

FIG. 7 is a diagram illustrating an example process 700 performed, for example, by a base station, in accordance with the present disclosure. Example process 700 is an example where the base station (e.g., base station 110) performs operations associated with techniques for configuration of a joint CSI-RS resource and CSI-RS port selection codebook.

As shown in FIG. 7, in some aspects, process 700 may include transmitting a CSI report setting indicating a report quantity and indicating one or more sets of CSI-RS resources identified by a CSI resource setting (block 710). For example, the base station (e.g., using communication manager 150 and/or transmission component 904, depicted in FIG. 9) may transmit a CSI report setting indicating a report quantity and indicating one or more sets of CSI-RS resources identified by a CSI resource setting associated with the CSI report setting, as described above. In some aspects, the report quantity includes a PMI based at least in part on a joint CSI-RS resource and CSI-RS port selection codebook. In some aspects, a port selection is based at least in part on the CSI-RS resources indicated by the CSI resource setting.

As further shown in FIG. 7, in some aspects, process 700 may include communicating with a UE in accordance with the CSI report setting, the CSI resource setting, and the codebook (block 720). For example, the base station (e.g., using communication manager 150 and/or reception component 902 or transmission component 904, depicted in FIG. 9) may communicate with a UE in accordance with the CSI report setting, the CSI resource setting, and the codebook, as described above.

Process 700 may include additional aspects, such as any single aspect or any combination of aspects described below and/or in connection with one or more other processes described elsewhere herein.

In a first aspect, PMI feedback associated with the PMI is based at least in part on a plurality of time division multiplexed CSI-RS resources.

In a second aspect, alone or in combination with the first aspect, a CSI-RS resource, associated with the PMI, is associated with one or more frequency division multiplexed or code division multiplexed CSI-RS ports.

In a third aspect, alone or in combination with one or more of the first and second aspects, the PMI is associated with one or more selection subsets of a number of CSI-RS resources indicated by the CSI resource setting.

In a fourth aspect, alone or in combination with one or more of the first through third aspects, the PMI is, for a selection subset of CSI-RS resources, associated with one or more selection sets of a number of CSI-RS ports.

In a fifth aspect, alone or in combination with one or more of the first through fourth aspects, the PMI is associated with a set of quantized linear combination coefficients of one or more selection subsets of CSI-RS resources and selection sets of CSI-RS ports associated with CSI-RS resources within the one or more selection subsets of CSI-RS resources.

In a sixth aspect, alone or in combination with one or more of the first through fifth aspects, the report quantity indicated by the CSI report setting includes a layer 1 (L1) reference signal received power or an L1 signal-to-interference-plus-noise ratio associated with the PMI.

In a seventh aspect, alone or in combination with one or more of the first through sixth aspects, the CSI report setting is associated with a PMI report based at least in part on a set of past measurements or a set of predicted beams.

In an eighth aspect, alone or in combination with one or more of the first through seventh aspects, a number of selection subsets of CSI-RS resources or a number of selection sets of CSI-RS ports associated with CSI-RS resources of the selection subsets of CSI-RS resources is based at least in part on at least one of a static configuration, a received configuration, or a UE selection, wherein the number of selection subsets or the number of selection sets is layer-common, layer-specific, resource-indicator-common, or resource-indicator-specific.

In a ninth aspect, alone or in combination with one or more of the first through eighth aspects, a set of quantized linear combination coefficients of the codebook is based at least in part on a wideband-specific report or a sub-band-specific report.

In a tenth aspect, alone or in combination with one or more of the first through ninth aspects, the PMI is based at least in part on at least one of a matrix or vector report of a selection subset of CSI-resources or a matrix or vector report of a selection set of CSI-RS ports.

In an eleventh aspect, alone or in combination with one or more of the first through tenth aspects, the PMI is based at least in part on a CSI-RS resource indicator of a subset of selected CSI-RS resources.

In a twelfth aspect, alone or in combination with one or more of the first through eleventh aspects, each CSI-RS resource, of a first selection subset of CSI-RS resources associated with the PMI, is associated with a single CSI-RS port and each CSI-RS resource, of a second selection subset of CSI-RS resources associated with the PMI, is associated with multiple CSI-RS ports.

In a thirteenth aspect, alone or in combination with one or more of the first through twelfth aspects, the PMI is associated with a codebook subset restriction associated with whether a linear combination is applicable to two or more of a subset of CSI-RS resources and CSI-RS ports indicated by the CSI resource setting associated with the CSI report setting.

In a fourteenth aspect, alone or in combination with one or more of the first through thirteenth aspects, the PMI is associated with a codebook subset restriction regarding amplitude restrictions on feedback coefficients.

In a fifteenth aspect, alone or in combination with one or more of the first through fourteenth aspects, the amplitude restrictions are associated with a restriction of a total allocated power for a subset of selected CSI-RS resources and CSI-RS ports.

In a sixteenth aspect, alone or in combination with one or more of the first through fifteenth aspects, the UE is configured with at least one CSI processing unit for a CSI report associated with the codebook.

In a seventeenth aspect, alone or in combination with one or more of the first through sixteenth aspects, a number of CSI processing units is based at least in part on a number of configured CSI-RS resources or a number of CSI-RS ports configured for the configured CSI-RS resources.

In an eighteenth aspect, alone or in combination with one or more of the first through seventeenth aspects, a number of CSI processing units is based at least in part on at least one of a number of different periodicities of CSI-RS or synchronization signal block resources or a number of CSI-RS resources associated with each of the different periodicities.

In a nineteenth aspect, alone or in combination with one or more of the first through eighteenth aspects, a number of CSI processing units is based at least part on a sub-band size, a number of sub-bands, or a number of frequency division compression bases.

In a twentieth aspect, alone or in combination with one or more of the first through nineteenth aspects, the codebook is associated with a dedicated codebook type information element associated with the CSI report setting and indicating the joint CSI-RS resource and CSI-RS port selection codebook.

In a twenty-first aspect, alone or in combination with one or more of the first through twentieth aspects, a report of the PMI is generated based at least in part on one or more machine learning models, wherein an input of the one or more machine learning models includes at least one of information associated with a signal measured from CSI-RS resources or CSI-RS ports indicated by the CSI resource setting or channel characteristics estimated from the CSI-RS resources or CSI-RS ports indicated by the CSI resource setting, and wherein an output of the one or more machine learning models includes the PMI and is based at least in part on the joint CSI-RS resource and CSI-RS port selection codebook.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
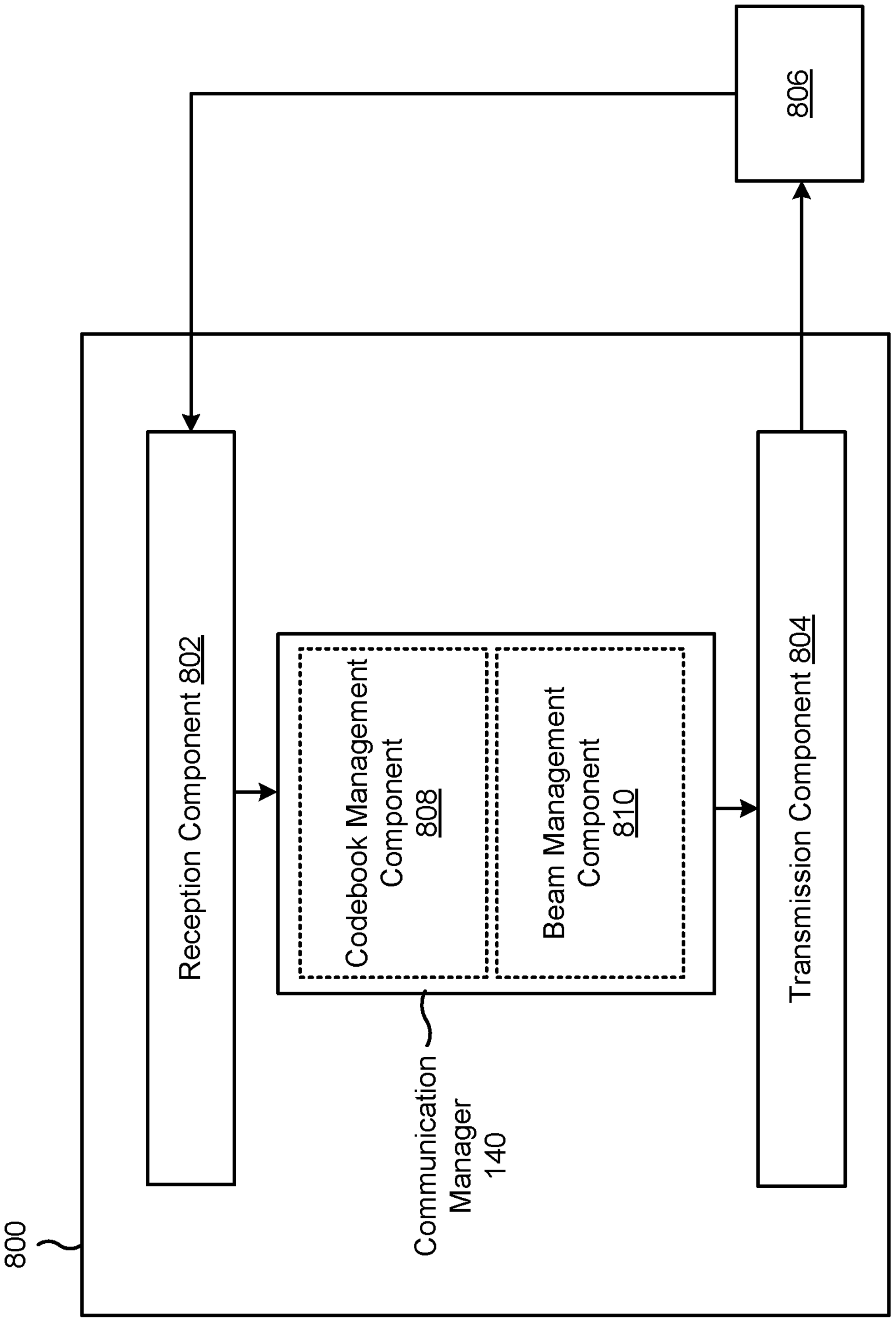
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a codebook management component 808 or a beam management component 810, among other examples.

In some aspects, the apparatus 800 may be configured to perform one or more operations described herein in connection with FIGS. 5A-5C. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a CSI report setting indicating a report quantity and indicating one or more sets of CSI-RS resources, wherein the Report quantity includes a PMI based at least in part on a joint CSI-RS resource and CSI-RS port selection codebook, wherein a port selection is based at least in part on the CSI-RS resources indicated by the CSI resource setting. The reception component 802 or the transmission component 804 may communicate with a base station in accordance with the CSI report setting and the codebook. The codebook management component 808 may use a joint CSI-RS resource and CSI-RS port selection codebook with beam management component 810 to perform CSI-RS based beam management.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
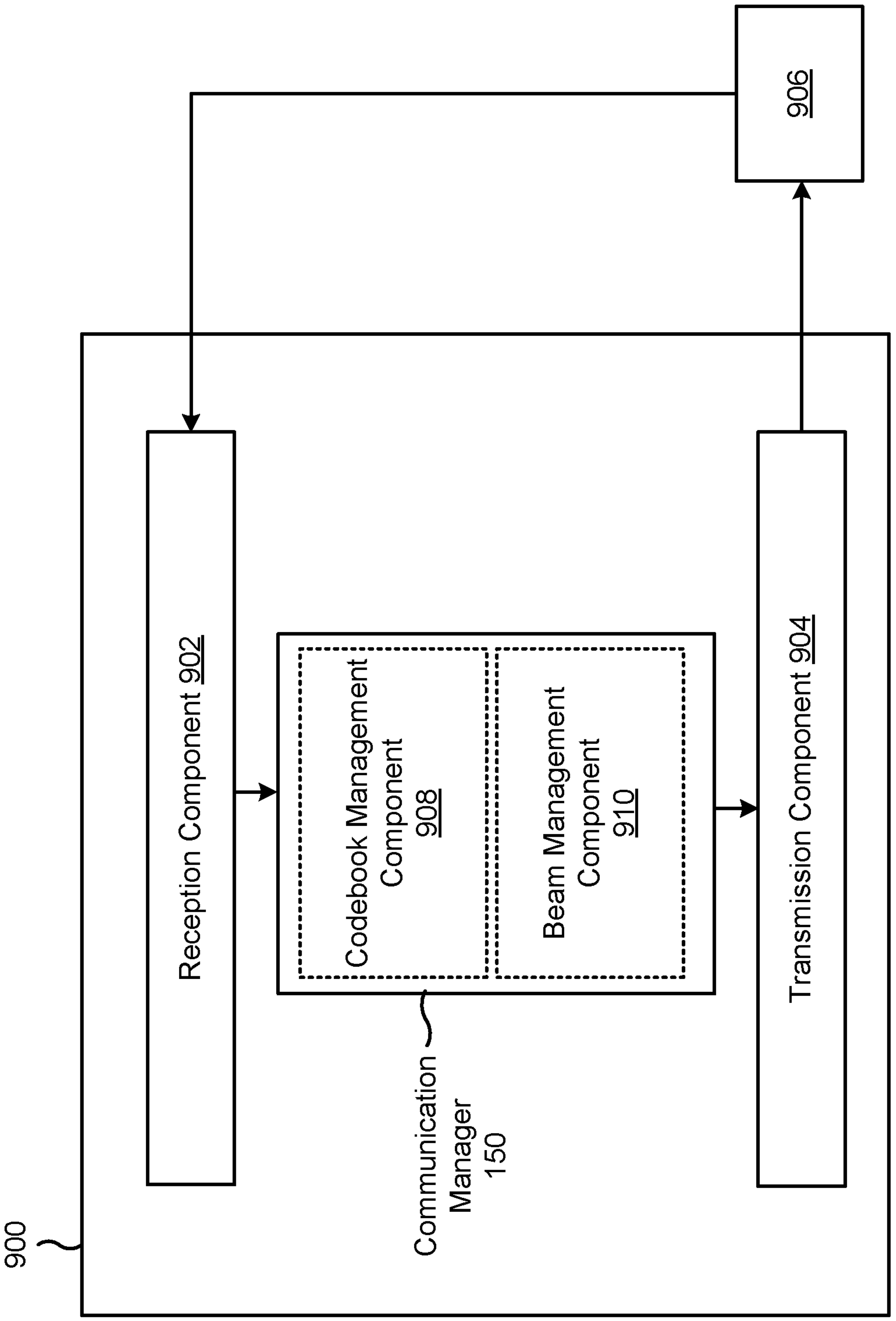

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a codebook management component 908 or a beam management component 910, among other examples.

In some aspects, the apparatus 900 may be configured to perform one or more operations described herein in connection with FIGS. 5A-5C. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit a CSI report setting indicating a report quantity and indicating one or more sets of CSI-RS, wherein the report quantity includes a PMI based at least in part on a joint CSI-RS resource and CSI-RS port selection codebook, wherein a port selection is based at least in part on the CSI-RS resources indicated by the CSI resource setting. The reception component 902 and/or the transmission component 904 may communicate with a UE (e.g., the apparatus 906) in accordance with the CSI report setting and the codebook. The codebook management component 908 may configure a joint CSI-RS resource and CSI-RS port selection codebook for the beam management component 910 and the UE (e.g., the apparatus 906) to use for beam management.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a channel state information (CSI) report setting indicating a report quantity and indicating one or more sets of CSI reference signal (CSI-RS) resources identified by a CSI resource setting associated with the CSI report setting, wherein the report quantity includes a precoding matrix indicator (PMI) based at least in part on a joint CSI-RS resource and CSI-RS port selection codebook, wherein a port selection is based at least in part on the CSI-RS resources indicated by the CSI resource setting; and communicating with a base station in accordance with the CSI report setting, the CSI resource setting, and the codebook.

Aspect 2: The method of Aspect 1, wherein PMI feedback associated with the PMI is based at least in part on a plurality of time division multiplexed CSI-RS resources.

Aspect 3: The method of Aspect 2, wherein a CSI-RS resource, associated with the PMI, is associated with one or more frequency division multiplexed or code division multiplexed CSI-RS ports.

Aspect 4: The method of any of Aspects 1 to 3, wherein the PMI is associated with one or more selection subsets of a number of CSI-RS resources indicated by the CSI resource setting.

Aspect 5: The method of any of Aspects 1 to 4, wherein the PMI is, for a selection subset of CSI-RS resources, associated with one or more selection sets of a number of CSI-RS ports.

Aspect 6: The method of any of Aspects 1 to 5, wherein the PMI is associated with a set of quantized linear combination coefficients of one or more selection subsets of CSI-RS resources and selection sets of CSI-RS ports associated with CSI-RS resources within the one or more selection subsets of CSI-RS resources.

Aspect 7: The method of any of Aspects 1 to 6, wherein the report quantity indicated by the CSI report setting includes a layer 1 (L1) reference signal received power or an L1 signal-to-interference-plus-noise ratio associated with the PMI.

Aspect 8: The method of any of Aspects 1 to 7, wherein the CSI report setting is associated with a PMI report based at least in part on a set of past measurements or a set of predicted beams.

Aspect 9: The method of any of Aspects 1 to 8, wherein a number of selection subsets of CSI-RS resources or a number of selection sets of CSI-RS ports associated with CSI-RS resources of the selection subsets of CSI-RS resources is based at least in part on at least one of a static configuration, a received configuration, or a UE selection, wherein the number of selection subsets or the number of selection sets is layer-common, layer-specific, resource-indicator-common, or resource-indicator-specific.

Aspect 10: The method of any of Aspects 1 to 9, wherein a set of quantized linear combination coefficients of the codebook is based at least in part on a wideband-specific report or a sub-band-specific report.

Aspect 11: The method of any of Aspects 1 to 10, wherein the PMI is based at least in part on at least one of a matrix or vector report of a selection subset of CSI-resources or a matrix or vector report of a selection set of CSI-RS ports.

Aspect 12: The method of any of Aspects 1 to 11, wherein the PMI is based at least in part on a CSI-RS resource indicator of a subset of selected CSI-RS resources.

Aspect 13: The method of any of Aspects 1 to 12, wherein each CSI-RS resource, of a first selection subset of CSI-RS resources associated with the PMI, is associated with a single CSI-RS port and each CSI-RS resource, of a second selection subset of CSI-RS resources associated with the PMI, is associated with multiple CSI-RS ports.

Aspect 14: The method of any of Aspects 1 to 13, wherein the PMI is associated with a codebook subset restriction associated with whether a linear combination is applicable to two or more of a subset of CSI-RS resources and CSI-RS ports indicated by the CSI resource setting associated with the CSI report setting.

Aspect 15: The method of any of Aspects 1 to 14, wherein the PMI is associated with a codebook subset restriction regarding amplitude restrictions on feedback coefficients.

Aspect 16: The method of Aspect 15, wherein the amplitude restrictions are associated with a restriction of a total allocated power for a subset of selected CSI-RS resources and CSI-RS ports.

Aspect 17: The method of any of Aspects 1 to 16, wherein the UE is configured with at least one CSI processing unit for a CSI report associated with the codebook.

Aspect 18: The method of Aspect 17, wherein a number of CSI processing units is based at least in part on a number of configured CSI-RS resources or a number of CSI-RS ports configured for the configured CSI-RS resources.

Aspect 19: The method of any of Aspects 17 to 18, wherein a number of CSI processing units is based at least in part on at least one of a number of different periodicities of CSI-RS or synchronization signal block resources or a number of CSI-RS resources associated with each of the different periodicities.

Aspect 20: The method of any of Aspects 17 to 19, wherein a number of CSI processing units is based at least part on a sub-band size, a number of sub-bands, or a number of frequency division compression bases.

Aspect 21: The method of any of Aspects 1 to 20, wherein the codebook is associated with a dedicated codebook type information element associated with the CSI report setting and indicating the joint CSI-RS resource and CSI-RS port selection codebook.

Aspect 22: The method of any of Aspects 1 to 21, wherein the UE is configured with one or more machine learning based models to generate a report of the PMI, wherein an input of the one or more machine learning models includes at least one of information associated with a signal measured from CSI-RS resources or CSI-RS ports indicated by the CSI resource setting or channel characteristics estimated from the CSI-RS resources or CSI-RS ports indicated by the CSI resource setting, and wherein an output of the one or more machine learning models includes the PMI and is based at least in part on the joint CSI-RS resource and CSI-RS port selection codebook.

Aspect 23: A method of wireless communication performed by a base station, comprising: transmitting a channel state information (CSI) report setting indicating a report quantity and indicating one or more sets of CSI reference signal (CSI-RS) resources identified by a CSI resource setting associated with the CSI report setting, wherein the report quantity includes a precoding matrix indicator (PMI) based at least in part on a joint CSI-RS resource and CSI-RS port selection codebook, wherein a port selection is based at least in part on the CSI-RS resources indicated by the CSI resource setting; and communicating with a user equipment (UE) in accordance with the CSI report setting, the CSI resource setting, and the codebook.

Aspect 24: The method of Aspect 23, wherein PMI feedback associated with the PMI is based at least in part on a plurality of time division multiplexed CSI-RS resources.

Aspect 25: The method of Aspect 24, wherein a CSI-RS resource, associated with the PMI, is associated with one or more frequency division multiplexed or code division multiplexed CSI-RS ports.

Aspect 26: The method of any of Aspects 23 to 25, wherein the PMI is associated with one or more selection subsets of a number of CSI-RS resources indicated by the CSI resource setting.

Aspect 27: The method of any of Aspects 23 to 26, wherein the PMI is, for a selection subset of CSI-RS resources, associated with one or more selection sets of a number of CSI-RS ports.

Aspect 28: The method of any of Aspects 23 to 27, wherein the PMI is associated with a set of quantized linear combination coefficients of one or more selection subsets of CSI-RS resources and selection sets of CSI-RS ports associated with CSI-RS resources within the one or more selection subsets of CSI-RS resources.

Aspect 29: The method of any of Aspects 23 to 28, wherein the report quantity indicated by the CSI report setting includes a layer 1 (L1) reference signal received power or an L1 signal-to-interference-plus-noise ratio associated with the PMI.

Aspect 30: The method of any of Aspects 23 to 29, wherein the CSI report setting is associated with a PMI report based at least in part on a set of past measurements or a set of predicted beams.

Aspect 31: The method of any of Aspects 23 to 30, wherein a number of selection subsets of CSI-RS resources or a number of selection sets of CSI-RS ports associated with CSI-RS resources of the selection subsets of CSI-RS resources is based at least in part on at least one of a static configuration, a received configuration, or a UE selection, wherein the number of selection subsets or the number of selection sets is layer-common, layer-specific, resource-indicator-common, or resource-indicator-specific.

Aspect 32: The method of any of Aspects 23 to 31, wherein a set of quantized linear combination coefficients of the codebook is based at least in part on a wideband-specific report or a sub-band-specific report.

Aspect 33: The method of any of Aspects 23 to 32, wherein the PMI is based at least in part on at least one of a matrix or vector report of a selection subset of CSI-resources or a matrix or vector report of a selection set of CSI-RS ports.

Aspect 34: The method of any of Aspects 23 to 33, wherein the PMI is based at least in part on a CSI-RS resource indicator of a subset of selected CSI-RS resources.

Aspect 35: The method of any of Aspects 23 to 34, wherein each CSI-RS resource, of a first selection subset of CSI-RS resources associated with the PMI, is associated with a single CSI-RS port and each CSI-RS resource, of a second selection subset of CSI-RS resources associated with the PMI, is associated with multiple CSI-RS ports.

Aspect 36: The method of any of Aspects 23 to 35, wherein the PMI is associated with a codebook subset restriction associated with whether a linear combination is applicable to two or more of a subset of CSI-RS resources and CSI-RS ports indicated by the CSI resource setting associated with the CSI report setting.

Aspect 37: The method of any of Aspects 23 to 36, wherein the PMI is associated with a codebook subset restriction regarding amplitude restrictions on feedback coefficients.

Aspect 38: The method of Aspect 37, wherein the amplitude restrictions are associated with a restriction of a total allocated power for a subset of selected CSI-RS resources and CSI-RS ports.

Aspect 39: The method of any of Aspects 23 to 38, wherein the UE is configured with at least one CSI processing unit for a CSI report associated with the codebook.

Aspect 40: The method of Aspect 39, wherein a number of CSI processing units is based at least in part on a number of configured CSI-RS resources or a number of CSI-RS ports configured for the configured CSI-RS resources.

Aspect 41: The method of any of Aspects 39 to 40, wherein a number of CSI processing units is based at least in part on at least one of a number of different periodicities of CSI-RS or synchronization signal block resources or a number of CSI-RS resources associated with each of the different periodicities.

Aspect 42: The method of any of Aspects 39 to 41, wherein a number of CSI processing units is based at least part on a sub-band size, a number of sub-bands, or a number of frequency division compression bases.

Aspect 43: The method of any of Aspects 23 to 42, wherein the codebook is associated with a dedicated codebook type information element associated with the CSI report setting and indicating the joint CSI-RS resource and CSI-RS port selection codebook.

Aspect 44: The method of any of Aspects 23 to 43, wherein a report of the PMI is generated based at least in part on one or more machine learning models, wherein an input of the one or more machine learning models includes at least one of information associated with a signal measured from CSI-RS resources or CSI-RS ports indicated by the CSI resource setting or channel characteristics estimated from the CSI-RS resources or CSI-RS ports indicated by the CSI resource setting, and wherein an output of the one or more machine learning models includes the PMI and is based at least in part on the joint CSI-RS resource and CSI-RS port selection codebook.

Aspect 45: An apparatus for wireless communication at a device, comprising a processor; memory coupled with the processor; and instructions stored in the memory and executable by the processor to cause the apparatus to perform the method of one or more of Aspects 1-22.

Aspect 46: A device for wireless communication, comprising a memory and one or more processors coupled to the memory, the one or more processors configured to perform the method of one or more of Aspects 1-23.

Aspect 47: An apparatus for wireless communication, comprising at least one means for performing the method of one or more of Aspects 1-24.

Aspect 48: A non-transitory computer-readable medium storing code for wireless communication, the code comprising instructions executable by a processor to perform the method of one or more of Aspects 1-25.

Aspect 49: A non-transitory computer-readable medium storing a set of instructions for wireless communication, the set of instructions comprising one or more instructions that, when executed by one or more processors of a device, cause the device to perform the method of one or more of Aspects 1-26.

Aspect 50: An apparatus for wireless communication at a device, comprising a processor; memory coupled with the processor; and instructions stored in the memory and executable by the processor to cause the apparatus to perform the method of one or more of Aspects 23-44.

Aspect 51: A device for wireless communication, comprising a memory and one or more processors coupled to the memory, the one or more processors configured to perform the method of one or more of Aspects 23-44.

Aspect 52: An apparatus for wireless communication, comprising at least one means for performing the method of one or more of Aspects 23-44.

Aspect 53: A non-transitory computer-readable medium storing code for wireless communication, the code comprising instructions executable by a processor to perform the method of one or more of Aspects 23-44.

Aspect 54: A non-transitory computer-readable medium storing a set of instructions for wireless communication, the set of instructions comprising one or more instructions that, when executed by one or more processors of a device, cause the device to perform the method of one or more of Aspects 23-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving a channel state information (CSI) report setting indicating a report quantity and indicating one or more sets of CSI reference signal (CSI-RS) resources identified by a CSI resource setting associated with the CSI report setting, wherein the report quantity includes a precoding matrix indicator (PMI) based at least in part on a joint CSI-RS resource and CSI-RS port selection codebook, wherein a port selection is based at least in part on the one or more sets of CSI-RS resources identified by the CSI resource setting, and wherein the CSI report setting is associated with a CSI report configuration information element that includes a codebook configuration information element associated with the CSI-RS port selection codebook; and communicating with a base station in accordance with the CSI report setting, the CSI resource setting, and the CSI-RS port selection codebook.

2. The method of claim 1, wherein PMI feedback associated with the PMI is based at least in part on a plurality of time division multiplexed CSI-RS resources.

3. The method of claim 2, wherein a CSI-RS resource, associated with the PMI, is associated with one or more frequency division multiplexed or code division multiplexed CSI-RS ports.

4. The method of claim 1, wherein the PMI is associated with one or more selection subsets of a number of CSI-RS resources indicated by the CSI resource setting.

5. The method of claim 1, wherein the PMI is, for a selection subset of CSI-RS resources, associated with one or more selection sets of a number of CSI-RS ports.

6. The method of claim 1, wherein the PMI is associated with a set of quantized linear combination coefficients of one or more selection subsets of CSI-RS resources and selection sets of CSI-RS ports associated with CSI-RS resources within the one or more selection subsets of CSI-RS resources.

7. The method of claim 1, wherein the report quantity indicated by the CSI report setting includes a layer 1 (L1) reference signal received power or an L1 signal-to-interference-plus-noise ratio associated with the PMI.

8. The method of claim 1, wherein the CSI report setting is associated with a PMI report based at least in part on a set of past measurements or a set of predicted beams.

9. The method of claim 1, wherein a number of selection subsets of CSI-RS resources or a number of selection sets of CSI-RS ports associated with CSI-RS resources of the selection subsets of CSI-RS resources is based at least in part on at least one of a static configuration, a received configuration, or a UE selection, wherein the number of selection subsets or the number of selection sets is layer-common, layer-specific, resource-indicator-common, or resource-indicator-specific.

10. The method of claim 1, wherein a set of quantized linear combination coefficients of the CSI-RS port selection codebook is based at least in part on a wideband-specific report or a sub-band-specific report.

11. The method of claim 1, wherein the PMI is based at least in part on at least one of a matrix or vector report of a selection subset of CSI-resources or a matrix or vector report of a selection set of CSI-RS ports.

12. The method of claim 1, wherein the PMI is based at least in part on a CSI-RS resource indicator of a subset of selected CSI-RS resources.

13. The method of claim 1, wherein each CSI-RS resource, of a first selection subset of CSI-RS resources associated with the PMI, is associated with a single CSI-RS port and each CSI-RS resource, of a second selection subset of CSI-RS resources associated with the PMI, is associated with multiple CSI-RS ports.

14. The method of claim 1, wherein the PMI is associated with a codebook subset restriction associated with whether a linear combination is applicable to two or more of a subset of CSI-RS resources and CSI-RS ports indicated by the CSI resource setting associated with the CSI report setting.

15. The method of claim 1, wherein the PMI is associated with a codebook subset restriction regarding amplitude restrictions on feedback coefficients.

16. The method of claim 15, wherein the amplitude restrictions are associated with a restriction of a total allocated power for a subset of selected CSI-RS resources and CSI-RS ports.

17. The method of claim 1, wherein the UE is configured with at least one CSI processing unit for a CSI report associated with the CSI-RS port selection codebook.

18. The method of claim 17, wherein a number of CSI processing units is based at least in part on a number of configured CSI-RS resources or a number of CSI-RS ports configured for the configured CSI-RS resources.

19. The method of claim 17, wherein a number of CSI processing units is based at least in part on at least one of a number of different periodicities of CSI-RS or synchronization signal block resources or a number of CSI-RS resources associated with each of the different periodicities.

20. The method of claim 17, wherein a number of CSI processing units is based at least part on a sub-band size, a number of sub-bands, or a number of frequency division compression bases.

21. The method of claim 1, wherein the codebook configuration information element indicates the joint CSI-RS resource and the CSI-RS port selection codebook.

22. The method of claim 1, wherein the UE is configured with one or more machine learning models to generate a report of the PMI, wherein an input of the one or more machine learning models includes at least one of information associated with a measured signal or estimated channel characteristics, and wherein an output of the one or more machine learning models includes the PMI and is based at least in part on the joint CSI-RS resource and the CSI-RS port selection codebook.

23. A method of wireless communication performed by a base station, comprising:

transmitting a channel state information (CSI) report setting indicating a report quantity and indicating one or more sets of CSI reference signal (CSI-RS) resources identified by a CSI resource setting associated with the CSI report setting, wherein the report quantity includes a precoding matrix indicator (PMI) based at least in part on a joint CSI-RS resource and CSI-RS port selection codebook, wherein a port selection is based at least in part on the one or more sets of CSI-RS resources identified by the CSI resource setting, and wherein the CSI report setting is associated with a CSI report configuration information element that includes a codebook configuration information element associated with the CSI-RS port selection codebook; and communicating with a user equipment (UE) in accordance with the CSI report setting, the CSI resource setting, and the CSI-RS port selection codebook.

24. The method of claim 23, wherein PMI feedback associated with the PMI is based at least in part on a plurality of time division multiplexed CSI-RS resources.

25. The method of claim 24, wherein a CSI-RS resource, associated with the PMI, is associated with one or more frequency division multiplexed or code division multiplexed CSI-RS ports.

26. The method of claim 23, wherein the PMI is associated with one or more selection subsets of a number of CSI-RS resources indicated by the CSI resource setting.

27. The method of claim 23, wherein the PMI is, for a selection subset of CSI-RS resources, associated with one or more selection sets of a number of CSI-RS ports.

28. The method of claim 23, wherein the PMI is associated with a set of quantized linear combination coefficients of one or more selection subsets of CSI-RS resources and selection sets of CSI-RS ports associated with CSI-RS resources within the one or more selection subsets of CSI-RS resources.

29. A user equipment (UE) for wireless communication, comprising:

one or more memories; and one or more processors, coupled to the one or more memories, configured to:

receive a channel state information (CSI) report setting indicating a report quantity and indicating one or more sets of CSI reference signal (CSI-RS) resources identified by a CSI resource setting associated with the CSI report setting, wherein the report quantity includes a precoding matrix indicator (PMI) based at least in part on a joint CSI-RS resource and CSI-RS port selection codebook, wherein a port selection is based at least in part on the one or more sets of CSI-RS resources identified by the CSI resource setting, and wherein the CSI report setting is associated with a CSI report configuration information element that includes a codebook configuration information element associated with the CSI-RS port selection codebook; and communicate with a base station in accordance with the CSI report setting, the CSI resource setting, and the CSI-RS port selection codebook.

30. A base station for wireless communication, comprising:

one or more memories; and one or more processors, coupled to one or more memories, configured to:

transmit a channel state information (CSI) report setting indicating a report quantity and indicating one or more sets of CSI reference signal (CSI-RS) resources identified by a CSI resource setting associated with the CSI report setting, wherein the report quantity includes a precoding matrix indicator (PMI) based at least in part on a joint CSI-RS resource and CSI-RS port selection codebook, wherein a port selection is based at least in part on the one or more sets of CSI-RS resources identified by the CSI resource setting, and wherein the CSI report setting is associated with a CSI report configuration information element that includes a codebook configuration information element associated with the CSI-RS port selection codebook; and communicate with a user equipment (UE) in accordance with the CSI report setting, the CSI resource setting, and the CSI-RS port selection codebook.

* * * * *